US008840801B2

(12) United States Patent
Lee et al.

(10) Patent No.: US 8,840,801 B2
(45) Date of Patent: Sep. 23, 2014

(54) PREPARATION METHOD OF MAGNETIC CLUSTER COLLOID AND MAGNETIC CLUSTER COLLOID PREPARED THEREBY

(75) Inventors: Jin Kyu Lee, Seoul (KR); Jin Myung Cha, Seoul (KR)

(73) Assignees: Seoul National University R&DB Foundation, Seoul (KR); Nanobrick Co., Ltd., Suwon (KR)

( * ) Notice: Subject to any disclaimer, the term of this patent is extended or adjusted under 35 U.S.C. 154(b) by 0 days.

(21) Appl. No.: 13/639,855

(22) PCT Filed: Apr. 5, 2011

(86) PCT No.: PCT/KR2011/002369
§ 371 (c)(1),
(2), (4) Date: Jan. 6, 2013

(87) PCT Pub. No.: WO2011/126269
PCT Pub. Date: Oct. 13, 2011

(65) Prior Publication Data
US 2013/0099152 A1    Apr. 25, 2013

(30) Foreign Application Priority Data
Apr. 5, 2010    (KR) .................. 10-2010-0031018

(51) Int. Cl.
B22F 3/00        (2006.01)
C04B 35/64       (2006.01)
B01J 13/00       (2006.01)
H01F 1/01        (2006.01)
H01F 1/44        (2006.01)
B82Y 30/00       (2011.01)

(52) U.S. Cl.
CPC ............... *H01F 1/01* (2013.01); *B01J 13/0047* (2013.01); *B82Y 30/00* (2013.01); *B01J 13/0043* (2013.01); *Y10S 977/773* (2013.01); *H01F 1/44* (2013.01)

USPC ......................................... 252/62.55; 977/773

(58) Field of Classification Search
CPC ........ B82Y 15/00; B82Y 25/00; B82Y 30/00; H01F 1/445; H01F 1/01; H01F 1/44; B01J 13/0043; B01J 3/0008; B01J 13/0047; Y10S 436/806; Y10S 977/773
USPC ...... 252/62.55, 62.51 R, 62.56, 62.57, 62.59, 252/62.62, 62.63, 62.64, 62.51 C, 512, 513; 516/95; 428/842.3, 900; 427/127, 598; 977/773
See application file for complete search history.

(56) References Cited

U.S. PATENT DOCUMENTS

2009/0004098 A1*  1/2009  Schmidt et al. .............. 423/608

FOREIGN PATENT DOCUMENTS

JP     1986-281023 A    12/1986
JP     2006-188727 A     7/2006
(Continued)

OTHER PUBLICATIONS

Gubin et al., "Magnetic nanoparticles: preparation, structure and properties", 2005, Russian Chemical Reviews, vol. 74 (6), pp. 489-520.*

(Continued)

*Primary Examiner* — Carol M Koslow
*Assistant Examiner* — Lynne Edmondson (57) ABSTRACT

This invention relates to a manufacturing method of colloid comprising magnetic nanoclusters and magnetic nanocluster colloid made by the same. More particularly, this invention relates to a manufacturing method of colloid comprising magnetic nanoclusters comprising magnetic precursor and heterometal precursor by a certain ratio and magnetic nanocluster colloid made by the same.

4 Claims, 9 Drawing Sheets

(56) References Cited

FOREIGN PATENT DOCUMENTS

| JP | 2008-521747 | | 6/2008 |
| JP | 2008-521747 A | * | 6/2008 |
| JP | 2008-521747 A | * | 6/2008 |
| KR | 10-2004-0048093 A | | 6/2004 |
| KR | 10-2009-0122845 A | | 12/2009 |

OTHER PUBLICATIONS

Upadhyay et al. "Characterization of a temperature-sensitive magnetic fluid", 1997, Physical Review B, vol. 55(9), pp. 5585-5588. (ref 164 in Gubin).*

JP2008-521747A translation.*

Grubin et al., "Magnetic nanoparticles: preparation, structure and properties", 2005, Russian Chemical Reviews, vol. 74 (6), pp. 489-520.*

Seo et al., "Enhancement of magnetic resonance contrast effect using ionic magnetic clusters", Dec. 26, 2007, Journal of Colloid and Interface Science, vol. 319, pp. 429-434.*

International Search Report for PCT Application No. PCT/KR2011/002369, Korean Intellectual Property Office, Dec. 9, 2011.

* cited by examiner

| Reference 1 | Reference 2 | Example |
|---|---|---|
| 0.386g | 0.031g | 4.288g |

[1] Angew. Chem. Int. Ed., 2005, 44, 2782.
[2] Angew. Chem. Int. Ed., 2007, 46, 4342.

PREPARATION METHOD OF MAGNETIC CLUSTER COLLOID AND MAGNETIC CLUSTER COLLOID PREPARED THEREBY

PRIORITY

The present application claims priority under 35 U.S.C. §371 to PCT Application PCT/KR2011/002369, filed on Apr. 5, 2011, which claims priority to Korean Patent Application No. 10-2010-0031018, filed on Apr. 5, 2010, the disclosures of which are hereby incorporated by reference in their entireties.

FIELD OF THE INVENTION

The present invention relates to a manufacturing method of colloid comprising magnetic nanoclusters and colloid comprising magnetic nanoclusters made by the same. More particularly, this invention relates to manufacturing methods of colloid comprising magnetic nanoclusters prepared to comprise magnetic precursor and heterometal precursor by a certain ratio and colloid comprising magnetic nanoclusters made by the same.

BACKGROUND OF THE INVENTION

Nanoparticles mean particles having the size of approximately 1 nm to 100 nm. For past decades, various nanoparticles have been synthesized since nanoparticles have unique characteristics which other particles bigger than micron-size do not have, due to the quantum size effect, as well as nanoparticles have excellent characteristics such as luminescence characteristics, magnetic properties and catalytic characteristics due to the relatively huge surface area even in case of having same characteristics.

Particularly among the above nanoparticles, magnetic nanoparticles have excellent magnetic properties, and when the particle sizes are less than approximately 20 nm, each nanoparticle shows super paramagnetism, which has been drawing attention. Super paramagnetic nanoparticles are thought to be ideal to be applied in various fields, since super paramagnetic nanoparticles usually disperse evenly without showing general magnetic properties and the gap between the nanoparticles can be adjusted by external magnetic fields.

For the magnetic nanoparticles to be applied effectively, such particles should retain excellent magnetic properties, stably disperse in various environments and be able to easily combine with functional material.

Generally, magnetic nanoparticles have been synthesized by a co-precipitation process synthesizing 2+ or 3+ metal salts in alkaline aqueous solution at approximately 100° C. and the synthesized nanoparticles are called ferrofluid in occasion since the particles have excellent dispersion characteristics in aqueous solutions (U.S. Pat. No. 4,019,994; J. R. Kelley 'Process for the preparation of aqueous magnetic material suspensions', J. Mol. Liq., 1999, 83, 217; R. Massart et al. 'New aqueous magnetic fluids', J. Phys. Chem. B, 2001, 105, 1168; J. Depeyrot et al. 'New electric double-layered magnetic fluids based on copper, nickel, and zinc ferrite nanostructures'). However, there are problems with the magnetic nanoparticles prepared by the co-precipitation process such as irregular size distribution and difficulties in adjusting the particle size, as well as low crystalline property due to the low synthetic temperature which leads to weaker magnetic properties.

To solve this problem, methods to synthesize nanoparticles with excellent magnetic properties and regular size have been developed and the best known method is pyrolysis of metal salt or complex in organic solution (U.S. Pat. No. 6,676,729 B2; S. Sun 'Metal salt reduction to form alloy nanoparticles', U.S. Pat. No. 7,407,527 B2; T. Hyeon 'Synthesis of monodisperse and highly crystalline nano-particles of metals, alloys, metal-oxides, and multi-metal oxides without a size-selection process'). However, such magnetic nanoparticles synthesized by pyrolysis are limited to be applied in biofields, since there are difficulties in surface treatments, physical characteristics are inhibited by the organic ligands existing on the surface, and the particles do not disperse in aqueous solution due to the long alkyl chain organic molecule ligands on the surfaces of nanoparticles since the nanoparticles are protected or strongly combined with long alkyl chain organic molecule ligands on the surfaces.

To solve the above problem, methods have been developed to form nanocluster colloid by spontaneous agglomeration along with the reaction progress, instead of combining each nanoparticle using organic/inorganic material (Angew. Chem. Int. Ed., 2005, 44, 2782; Y. Li et al., 'Monodisperse magnetic single-crystal ferrite microspheres', J. Am. Chem. Soc., 2009, 131, 12900; A. Gupta et al., 'Adjusted growth of monodisperse self-supported superparamagnetic nanostructures of spherical and rod-like $CoFe_2O_4$ nanocrystals').

However, the above synthetic method does not allow mass production which is essential for practice or industrial use. Although magnetic nanocluster colloid prepared by the above method has excellent magnetic properties and dispersion characteristics, there are problems in mass production since its synthetic condition is complex and dangerous and the reaction generally occurs in a high-pressure reactor.

SUMMARY OF THE INVENTION

One object of the present invention is to provide a manufacturing method of magnetic nanocluster colloid with excellent magnetic properties and excellent dispersibility, comprising magnetic nanoclusters of uniform sizes which does not bind to each other or disassembled to each nanoparticle after repeated dispersion and collection, to overcome the aforementioned problems.

Another object of the present invention is to provide magnetic nanocluster colloid comprising magnetic nanoclusters manufactured by the aforementioned manufacturing method.

To achieve the aforementioned objects, this invention provides a manufacturing method of magnetic nanocluster colloid comprising magnetic nanoclusters, comprising the steps of:

(a) Dissolving magnetic precursor and organic ligand in the solvent to be hydrolyzed and forming amorphous gel by condensation between the hydrolyzed magnetic precursor;

(b) Phase-transition of the amorphous gel formed in the step (a) to crystalline metal oxide at the temperature ranging from 100° C. to 200° C.; and (c) Reduction of the crystalline metal oxide formed in the step (b) at the temperature ranging from 120° C. to 350° C. to prepare colloid dispersion solution comprising magnetic nanoclusters agglomerated of crystalline magnetic material.

In this invention, the magnetic precursor in the above step (a) is selected from the group consisting of metal nitrate based compound, metal sulfate based compound, metal fluoroacetoacetate based compound, metal halide ($M_aX_b$, M=Cr, Ni, Ti, Zr, Fe, Co, Zn, Gd, Ta, Nb, Pt, Au, Mg, Mn, Pd, Sr, Ag, Ba, Cu, W, Mo, Sn, Pb, X=F, Cl, Br, I, 0<a≤5, 0<b≤5) based compound, metal perchlorate based compound, metal sulfamate based compound, metal stearate based compound and organic metal based compound.

In this invention, the organic ligand in the above step (a) is selected from the group consisting of alkyl trimethyl ammonium halide based cation ligand, neutral ligand such as alkyl acid, trialkyl phosphine, trialkyl phosphine oxide, alkyl amine and alkyl thiol, and anion ligand such as sodium alkyl sulfate, sodium alkyl carboxylate, sodium alkyl phosphate and sodium acetate.

In this invention, the solvent in the above step (a) is selected from the group consisting of aromatic solvent, heterocyclic solvent, sulfoxide-based solvent, amide-based solvent, hydrocarbon solvent, ether-based solvent, polymer solvent, ionic liquid solvent, halogen hydrocarbon solvent, alcoholic solvent and water.

In this invention, the size of magnetic nanocluster in the above step (a) is controlled by adjusting molar ratio of the magnetic precursor and the organic ligand.

In this invention, in the above step (a), the magnetic precursor and the organic ligand are mixed by molar ratio of 1:0.01 to 1:500.

In this invention, the phase-transition in the above step (b) occurs by heating the solution comprising the amorphous gel formed in the step (a) to the temperature ranging from 100° C. to 200° C.

In this invention, the above step (c) comprises heating the colloid dispersion solution comprising the crystalline metal oxide prepared in the step (b) to the temperature ranging from 120° C. to 350° C. to be reduced to agglomerate into the crystalline magnetic nanomaterial.

In this invention, the metal halide in the above step (a) further comprises heterometal precursor consisting of metal halide ($M_aX_b$, M=Cr, Ni, Ti, Zr, Fe, Co, Zn, Gd, Ta, Nb, Pt, Au, Mg, Mn, Pd, Sr, Ag, Ba, Cu, W, Mo, Sn, Pb, X=F, Cl, Br, I, $0<a\leq5$, $0<b\leq5$) based compound.

In this invention, the heterometal precursor is added in 1 to 99 parts by weight per 100 parts by weight of the magnetic precursor.

Furthermore, this invention provides colloid comprising magnetic nanoclusters manufactured by the aforementioned method.

In this invention, the magnetic nanocluster included in the magnetic nanocluster colloid is formed by agglomeration of magnetic nanoparticles, wherein the diameter of the nanoparticle is 1 nm to 100 nm, and the diameter of the nanocluster is 10 nm to 1000 nm.

In this invention, the magnetic nanocluster is represented by any one of the following general formulae (1) to (4):

General Formula (1)

M (M is magnetic metal atom or alloy thereof)

General Formula (2)

$M_aO_b$ ($0<a\leq20$, $0<b\leq20$, M is magnetic metal atom or alloy thereof)

General Formula (3)

$M_cM'_d$ ($0<c\leq20$, $0<d\leq20$, M is magnetic metal atom or alloy thereof; M' is an element selected from the group consisting of Group II elements, transition metals, Group XIII elements, Group XIV elements, Group XV elements, lanthanoids and actinoids.)

General Formula (4)

$M_aM'_eO_b$ ($0<a\leq20$, $0<e\leq20$, $0<b\leq20$, M is magnetic metal atom or alloy thereof; M' is an element selected from the group consisting of Group II elements, transition metals, Group XIII elements, Group XIV elements, Group XV elements, lanthanoids and actinoids.)

In this invention, colloid comprising magnetic nanoclusters manufactured by the aforementioned method has one or more magnetic properties selected from paramagnetism, diamagnetism, ferromagnetism, antiferromagnetism, ferrimagnetism or super paramagnetism.

This invention relates to a composition which contains colloid comprising magnetic nanoclusters manufactured by the aforementioned method as effective component, and the composition can be used in reflective display, contrast medium, high-density magnetic recording medium, nanoscale electronics, material for permanent magnet, biomolecular probe, pharmaceutical carrier, optical film, patch film for security, polymer matrix mixture for other optical material formation, wastewater treatment, etc.

According to the invention, colloid comprising magnetic nanoclusters can be manufactured to retain excellent magnetic properties and dispersibility without being degraded after dispersion and collection in multiple times by simple and safe method, dissolving and refluxing the reactant.

Furthermore, this invention allows to easily adjust the size of the magnetic nanocluster according to the amount of the reactant, the ratio of reactants, the reaction temperature and the reaction time, and the magnetic property of the magnetic nanocluster containing heterometal can be adjusted as necessary by being enhanced or modified in various ways to, for example, super paramagnetism, paramagnetism, ferromagnetism, antiferromagnetism or ferrimagnetism according to the type and the amount of heterometal.

This invention can also provide magnetic nanoclusters in stable colloid solution state which can minimize complex surface coating and loss due to the same by freely modifying the surface of the magnetic nanocluster manufactured in bulk amount to provide particle dispersibility in the solution and solvent selectivity according to the aforementioned method.

DETAILED DESCRIPTION OF THE PREFERRED EMBODIMENT

In the following detailed description, preferred embodiments of this invention will be described in detail referring to the accompanying drawings to enable those skilled in the art to easily practice the invention.

The manufacturing method of the magnetic nanocluster of this invention comprises the steps of (a) dissolution of magnetic precursor and organic ligand in solvent to be hydrolyzed and condensation of hydrolyzed magnetic precursor to prepare amorphous gel; (b) phase-transition of the amorphous gel made in the step (a) to crystalline metal oxide at the temperature ranging from 100° C. to 200° C.; and (c) reduction of the crystalline metal oxide formed in the step (b) at the temperature ranging from 120° C. to 350° C. to prepare colloid dispersion solution comprising magnetic nanoclusters agglomerated of crystalline magnetic material.

Hereinafter, the manufacturing method of the above magnetic nanocluster will be described in more specific detail.

First, (a) magnetic precursor and organic ligand are added to the solvent to be dissolved to prepare amorphous metal gel solution.

The ultimate size of magnetic nanocluster can be controlled by adjusting parameters of manufacturing conditions in the preparation of the above solution mixture. The parameters of manufacturing conditions comprise the concentration of magnetic precursor, the concentration of organic ligand, reaction temperature, reaction time, etc. As the concentration of the magnetic precursor increases, or the concentration of the organic ligand decreases, or the reaction temperature increases, the size of the magnetic nanocluster increases.

When the size of magnetic nanocluster is controlled by adjusting the molar ratio of magnetic precursor and organic ligand, the molar ratio of magnetic precursor and organic ligand ranges preferably from 1:0.01 to 1:500, most preferably from 1:0.1 to 1:50. This is because when the amount of the organic ligand is below the above range the yield of the nanocluster decreases, and when the amount of organic ligand exceeds the above range the nanocluster is formed no larger than a certain size level. Thus, the magnetic nanocluster whose size ranges 10 nm to 1000 nm can be prepared by adjusting the concentrations of magnetic precursor and organic ligand.

The aforementioned magnetic precursor can be selected from the group consisting of metal nitrate based compound, metal sulfate based compound, metal fluoroacetoacetate based compound, metal halide ($M_aX_b$, M=Cr, Ni, Ti, Zr, Fe, Co, Zn, Gd, Ta, Nb, Pt, Au, Mg, Mn, Pd, Sr, Ag, Ba, Cu, W, Mo, Sn, Pb, X=F, Cl, Br, I, $0<a\leq5$, $0<b\leq5$) based compound, metal perchlorate based compound, metal sulfamate based compound, metal stearate based compound and organic metal based compound but is not necessarily limited to this group.

The aforementioned organic ligand can be selected from the group consisting of alkyl trimethyl ammonium halide based cation ligand, neutral ligand such as alkyl acid, trialkyl phosphine, trialkyl phosphine oxide, alkyl amine, alkyl thiol, and anion ligand such as sodium alkyl sulfate, sodium alkyl carboxylate, sodium alkyl phosphate and sodium acetate, but not necessarily limited to this group.

The aforementioned solvent can be selected from the group consisting of aromatic solvent, heterocyclic solvent, sulfoxide-based solvent, amide-based solvent, hydrocarbon solvent, ether-based solvent, polymer solvent, ionic liquid solvent, halogen hydrocarbon solvent, alcoholic solvent and water, but not necessarily limited to this group. When necessary, 2 or more organic ligands selected from the above group can be used together or successively.

At this time, metal precursor consisted of metal halide ($M_aX_b$, M=Cr, Ni, Ti, Zr, Fe, Co, Zn, Gd, Ta, Nb, Pt, Au, Mg, Mn, Pd, Sr, Ag, Ba, Cu, W, Mo, Sn, Pb, X=F, Cl, Br, I, $0<a\leq5$, $0<b\leq5$) based compound is further added in the aforementioned magnetic precursor. The metal (M) of the metal precursor to be added is a different sort of metal from that of the above magnetic precursor. Thus, the magnetic nanocluster containing heterogeneous metals can be prepared. The metal precursor is preferably added in 1 to 99 parts by weight per 100 parts by weight of the above magnetic precursor, but not necessarily limited to the ratio. The magnetic property of colloid whose magnetic nanocluster comprising heterometal is dispersed in the solvent can be controlled as necessary, since the magnetic property can be enhanced or modified in various ways to, for example, super paramagnetism, paramagnetism, ferromagnetism, antiferromagnetism, ferrimagnetism or diamagnetism according to the characteristics of heterometal.

Second, (b) the amorphous gel formed in the step (a) undergoes phase-transition at the temperature ranging from 100° C. to 200° C. to form crystalline metal oxide. Between 100° C. to 200° C., the amorphous gel forms metal oxide with more stable crystalline structure due to the phase-transition.

Third, (c) the crystalline metal oxide formed in the step (b) is reduced at the temperature ranging from 120° C. to 350° C. to prepare colloid dispersion solution comprising magnetic nanoclusters agglomerated of crystalline magnetic material.

The magnetic nanocluster as clustering of magnetic nanoparticles is formed as the crystalline metal oxide is reduced to spontaneously agglomerate. Regarding the agglomeration of magnetic oxide nanoparticles, according to this invention, the magnetic nanocluster is formed by spontaneous agglomeration as the phase-transition reaction proceeds under reflux condition, instead of using organic surface stabilizer or macromolecules as crosslinking agent for binding. Therefore, magnetic nanoclusters do not bind to each other or disassembled into each nanoparticle even after the magnetic clusters being dispersed and collected in multiple times. The solution wherein the magnetic nanoclusters are dispersed in the solvent without binding to each other is called colloid dispersion solution.

The magnetic nanoparticles of 1 nm to 100 nm in diameter may be agglomerated to form the magnetic nanocluster of 10 nm to 1000 nm in diameter, but not limited to the range. When the diameter of the magnetic nanocluster is below 10 nm, the magnetic property may decrease due to the reduced content of magnetic material in the cluster, whereas it may be difficult to apply the magnetic nanocluster into living body when the diameter of the magnetic nanocluster exceeds 1000 nm.

The size of the magnetic nanocluster to be prepared increases as the reaction temperature increases in this step. In this invention, the magnetic nanocluster may be formed at the room temperature or below, depending on the metal precursor, organic ligand and/or reaction solvent, but a certain amount of heating is required in general. Thus, the reaction temperature is required to be raised and maintained between 100° C. to 350° C., and if the reaction temperature is below 100° C. it may result in poor dispersibility, and if the reaction temperature exceeds 350° C. it may result in excessive crystal size to obtain ferromagnetism to let the magnetic nanoclusters bind to each other to form precipitation, thus it is preferable to maintain the above temperature range.

Magnetic nanocluster prepared by the above manufacturing method can be represented by any one of the following general formulae (1) to (4):

General Formula (1)

M (M is magnetic metal atom or alloy thereof)

General Formula (2)

$M_aO_b$ ($0<a\leq20$, $0<b\leq20$, M is magnetic metal atom or alloy thereof)

General Formula (3)

$M_cM'_d$ ($0<c\leq20$, $0<d\leq20$, M is magnetic metal atom or alloy thereof; M' is an element selected from the group consisting of Group II elements, transition metals, Group XIII elements, Group XIV elements, Group XV elements, lanthanoids and actinoids.)

General Formula (4)

$M_aM'_eO_b$ ($0<a\leq20$, $0<e\leq20$, $0<b\leq20$, M is magnetic metal atom or alloy thereof; M' is an element selected from the group consisting of Group II elements, transition metals, Group XIII elements, Group XIV elements, Group XV elements, lanthanoids and actinoids.)

General Formulae (1) and (3) represent magnetic nanoclusters consisting of metal such as single metal or alloy thereof, and two or more metals, and General Formulae (2) and (4) represent magnetic nanoclusters consisting of metal oxides comprising single metal or alloy thereof, and two or more metals.

Magnetic nanocluster colloid wherein the magnetic nanocluster is dispersed in the solvent can be provided by using the aforementioned magnetic nanocluster due to high dispersibility thereof. Colloid particles of 1 to several thousand nanometers in size have broad surface area and colloidal stability, resulting in various catalytic and optical characteristics. The magnetic nanocluster colloid dispersion solution manufactured according to this invention is stable, evenly dispersed without forming precipitation due to the excellent dispersibility based on the broad surface area and colloidal stability.

This invention further provides a composition containing colloid comprising magnetic nanoclusters manufactured by the aforementioned method as effective component, wherein the composition can be used in reflective display, contrast medium, high-density magnetic recording medium, nanoscale electronics, material for permanent magnet, biomolecular probe, pharmaceutical carrier, optical film, patch film for security, polymer matrix mixture for other optical material formation, wastewater treatment, etc.

Hereinafter, this invention will be described in more specific detail with the preferred embodiments. The following examples are only to illustrate this invention, and it will be appreciated by those skilled in the art that the scope of this invention is not limited to these preferred embodiments (examples).

EXAMPLE 1

Example 1-1

0.05 mol of iron chloride hydrate as magnetic precursor, 0.26 mol of NaOH as organic ligand, and 14.3 g of water were added to 500 mL of ethylene glycol as organic solvent and then dissolved at 70° C. The solution was refluxed at the high temperature of 300° C. to obtain colloidal dispersion solution wherein the magnetic nanocluster was dispersed as black precipitation after the reaction was completed. The prepared magnetic nanocluster colloidal dispersion solution was centrifuged at 4,000 rpm for 30 min, and then washed with ethanol and water to purify and collect the magnetic nanocluster.

Example 1-2

Same conditions applied as Example 1-1, except the amount of water was modified to 28.6 g. Black precipitation was obtained after the reaction was completed.

Example 1-3

Same conditions applied as Example 1-2, except the added amount of NaOH was modified to 0.78 mol. Black precipitation was obtained after the reaction was completed.

EXAMPLE 2

Example 2-1

Same conditions applied as Example 1-1, except 0.26 mol of ammonia was added instead of NaOH. Black precipitation was obtained after the reaction was completed.

Figure 1:
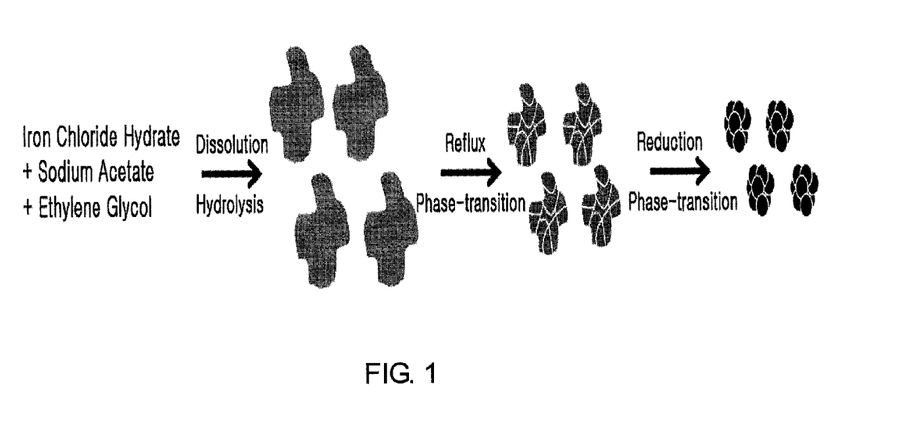
FIG. 1 is a diagram illustrating the manufacturing and formation process of colloid comprising magnetic nanoclusters manufactured according to the preferred embodiment of the invention.
Figure 2:
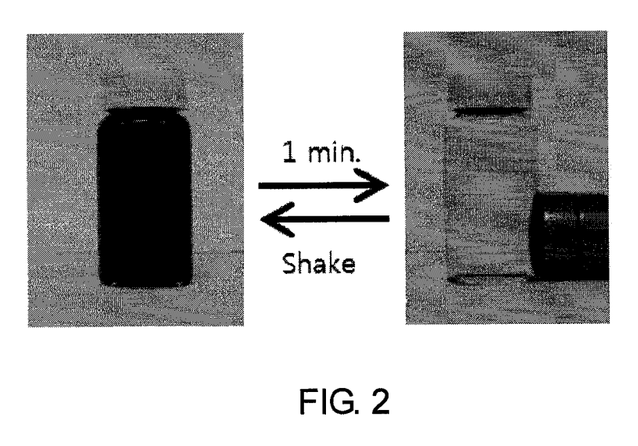
FIG. 2 is a diagram illustrating excellent dispersion and collection and re-dispersion of colloid comprising magnetic nanoclusters manufactured according to the preferred embodiment of the invention by external magnetic field.
Figure 3:
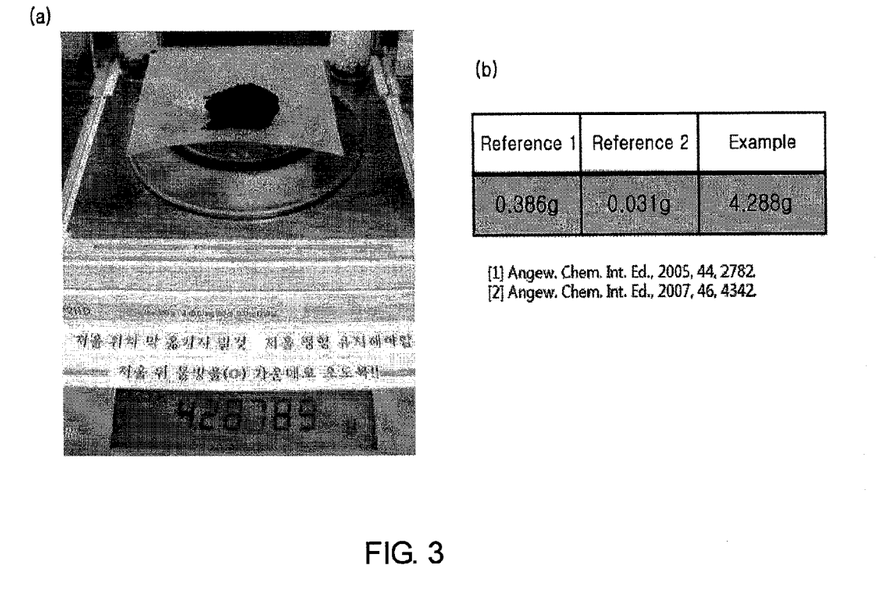
FIG. 3(a) is a photograph showing the amount of magnetic nanoclusters collected when the manufacturing method according to the preferred embodiment of the invention is conducted once.
FIG. 3(b) is a table comparing the collected amount using the conventional manufacturing method with the collected amount using the manufacturing method according to the preferred embodiment of this invention.
Figure 4:
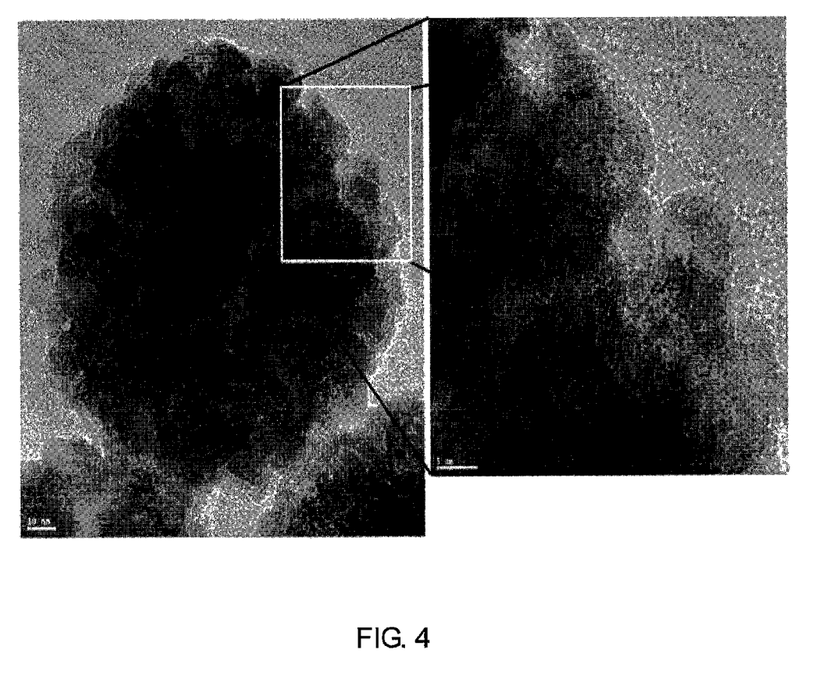
FIG. 4 is a high-resolution transmission electron microscopic view of colloid comprising magnetic nanoclusters manufactured according to the preferred embodiment of the invention.
Figure 5:
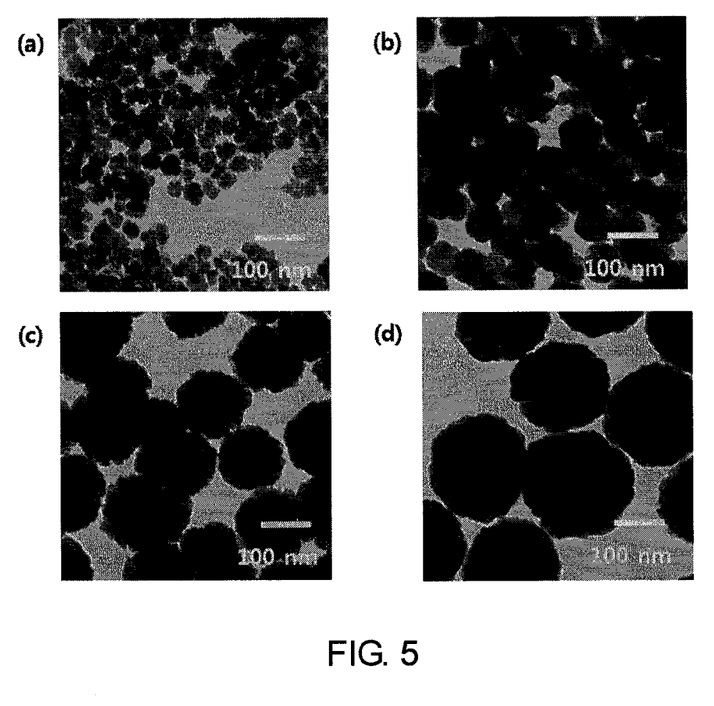
FIG. 5 is a transmission electron microscopic view of colloid comprising magnetic nanoclusters prepared according to the preferred embodiment of the invention.
Figure 6:
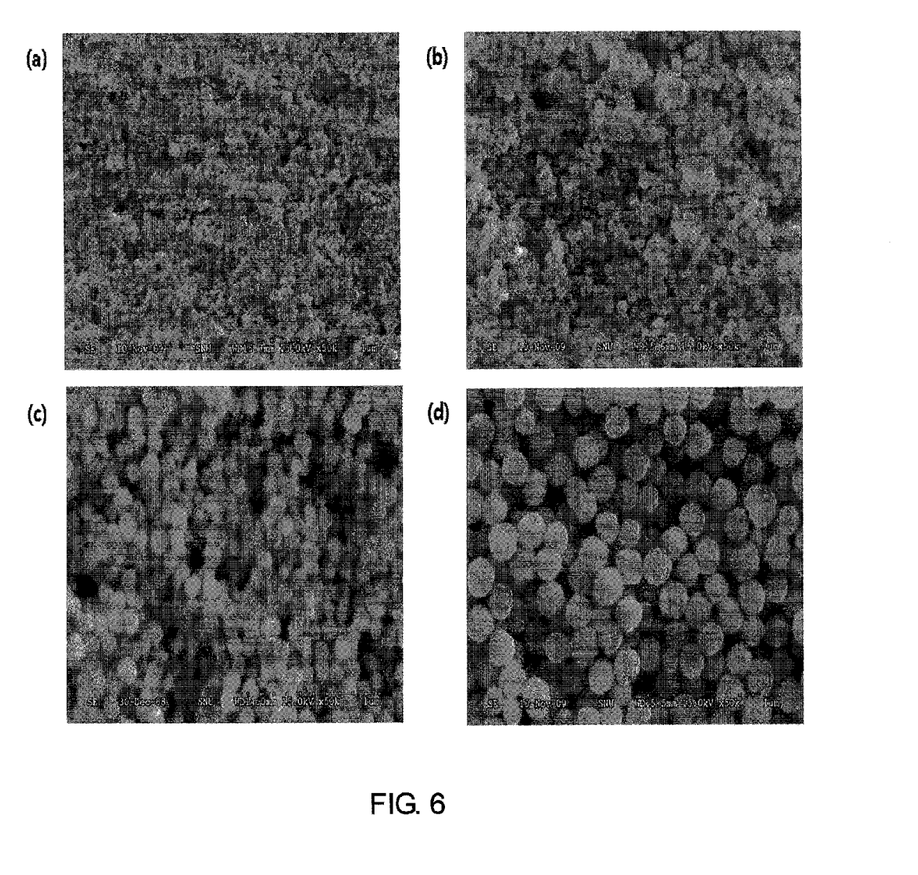
FIG. 6 is a scanning electron microscopic view of colloid comprising magnetic nanoclusters manufactured according to the preferred embodiment of the invention.
Figure 8:
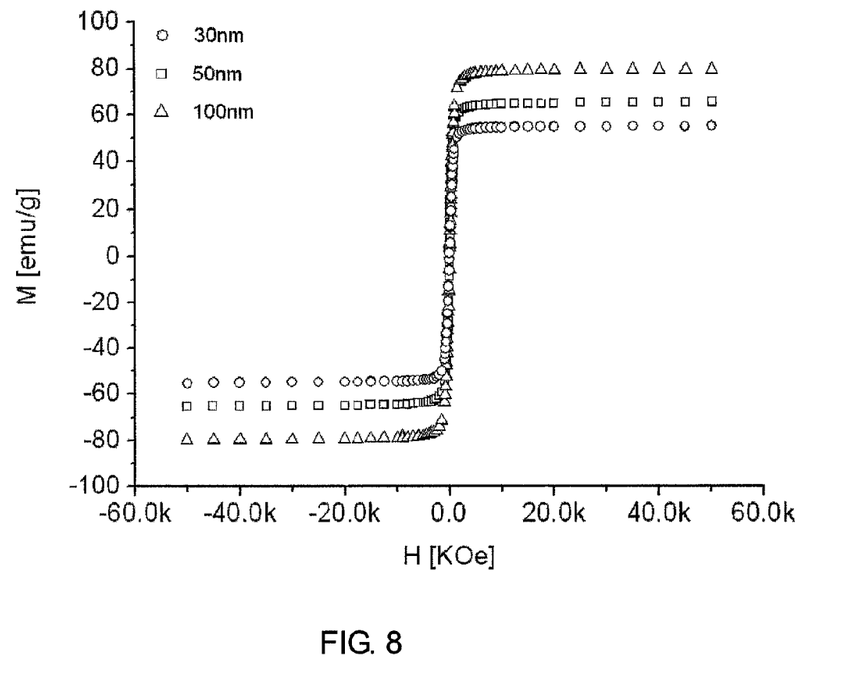
FIG. 8 is a magnetic property graph of colloid comprising magnetic nanoclusters manufactured according to the preferred embodiment of the invention.

The transmission electron microscopic photograph of the magnetic nanocluster colloid is shown in FIG. 5(a), the scanning electron microscopic photograph is shown in FIG. 6(a), and the saturation magnetization curve is shown in FIG. 8. As shown in FIG. 5(a), the magnetic nanocluster according to this example was found to be approximately 30 nm in diameter.

Example 2-2

Same conditions applied as Example 2-1, except the added amount of water was modified to 28.6 g. Black precipitation was obtained after the reaction was completed.

Example 2-3

Same conditions applied as Example 2-2, except the added amount of ammonia was modified to 0.78 mol. Black precipitation was obtained after the reaction was completed.

EXAMPLE 3

Example 3-1

Same conditions applied as Example 1-1, except 0.26 mol of sodium propionate was added instead of NaOH. Black precipitation was obtained after the reaction was completed.

Example 3-2

Same conditions applied as Example 3-1, except the added amount of water was modified to 28.6 g. Black precipitation was obtained after the reaction was completed.

The transmission electron microscopic photograph of the magnetic nanocluster colloid is shown in FIG. 5(b), the scanning electron microscopic photograph is shown in FIG. 6(b), and the saturation magnetization curve is shown in FIG. 8. As shown in FIG. 5(b), the magnetic nanocluster according to this example was found to be approximately 50 nm in diameter.

Example 3-3

Same conditions applied as Example 3-2, except the added amount of sodium propionate was modified to 0.78 mol. Black precipitation was obtained after the reaction was completed.

EXAMPLE 4

Example 4-1

Same conditions applied as Example 1-1, except 0.26 mol of sodium acetate was added instead of NaOH. Black precipitation was obtained after the reaction was completed.

Figure 7:
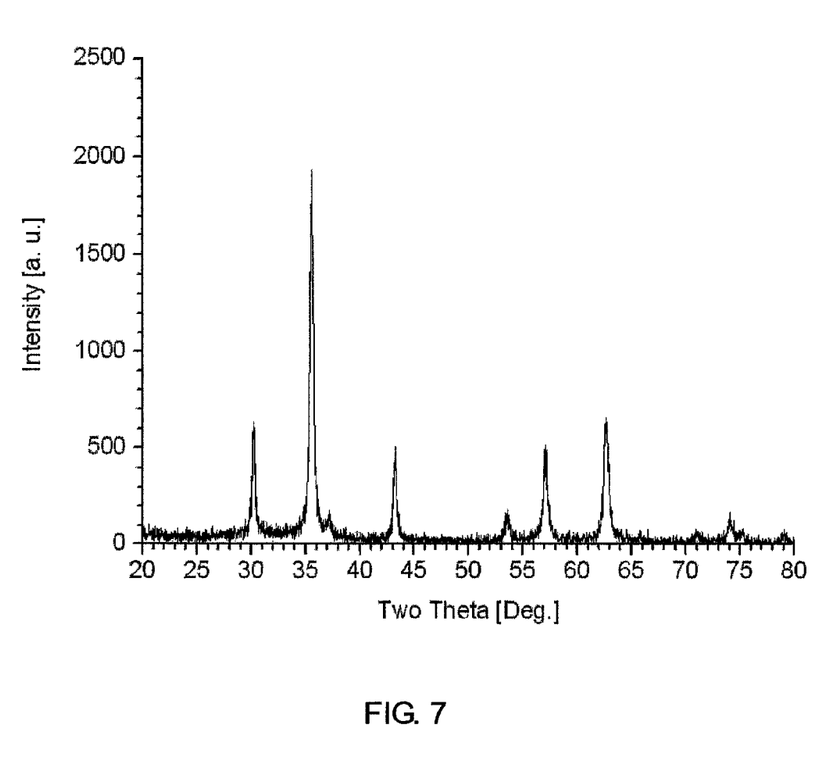
FIG. 7 is a crystal analysis graph of colloid comprising magnetic nanoclusters manufactured according to the preferred embodiment of the invention.
Figure 9:
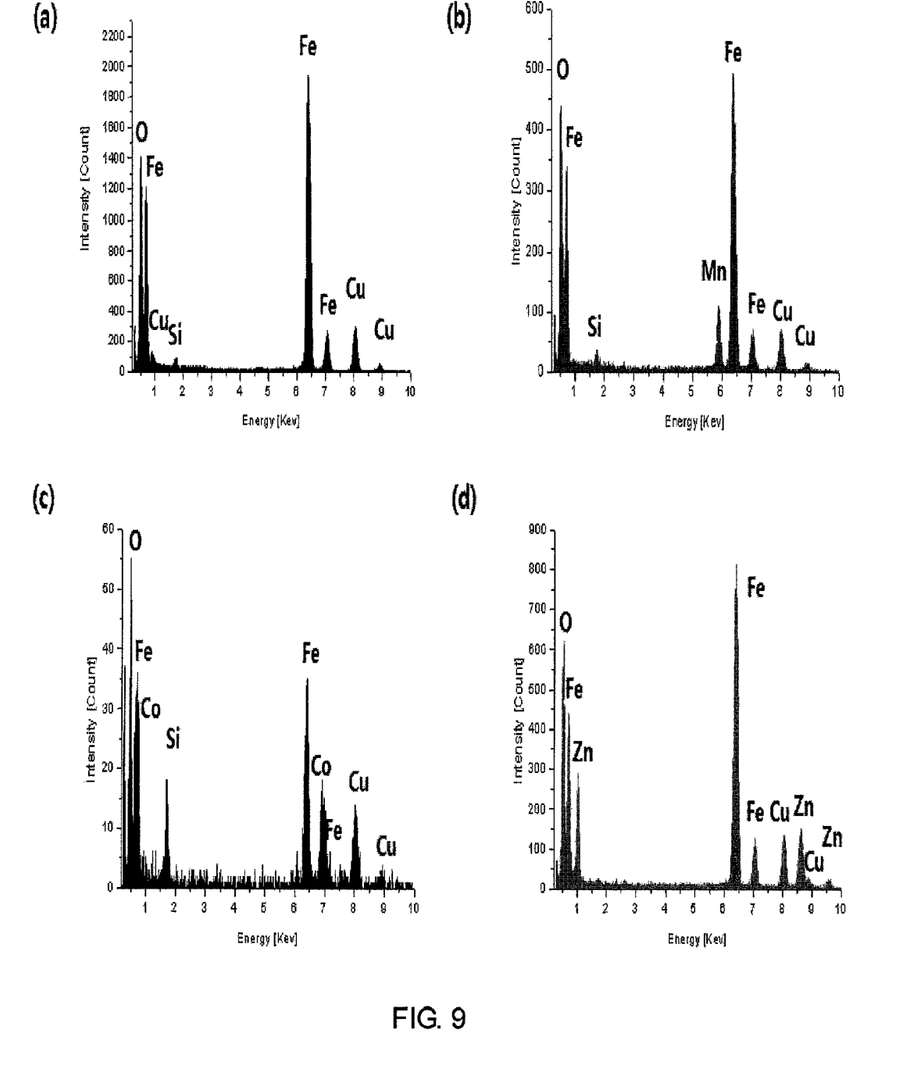
FIG. 9 is elemental analysis graphs of colloid comprising magnetic nanoclusters containing heterometal precursor manufactured according to the preferred embodiment of the invention.

The transmission electron microscopic photograph of the magnetic nanocluster colloid is shown in FIG. 5(c), the scanning electron microscopic photograph is shown in FIG. 6(c), the crystal analysis graph is shown in FIG. 7, the saturation magnetization curve is shown in FIG. 8, and metal content analysis graph is shown in FIG. 9(a). As shown in FIG. 5(c), the magnetic nanocluster according to this example was found to be approximately 100 nm in diameter.

Example 4-2

Same conditions applied as Example 4-1, except the added amount of water was modified to 28.6 g. Black precipitation was obtained after the reaction was completed.

Example 4-3

Same conditions applied as Example 4-2, except the added amount of sodium acetate was modified to 0.78 mol. Black precipitation was obtained after the reaction was completed.

EXAMPLE 5

Example 5-1

Same conditions applied as Example 1-1, except 0.26 mol of sodium acrylate was added instead of NaOH. Black precipitation was obtained after the reaction was completed.

Example 5-2

Same conditions applied as Example 5-1, except the added amount of water was modified to 28.6 g. Black precipitation was obtained after the reaction was completed.

Example 5-3

Same conditions applied as Example 5-2, except the added amount of sodium acrylate was modified to 0.78 mol. Black precipitation was obtained after the reaction was completed.

EXAMPLE 6

Example 6-1

Same conditions applied as Example 1-1, except 0.26 mol of sodium benzoate was added instead of NaOH. Black precipitation was obtained after the reaction was completed.

Example 6-2

Same conditions applied as Example 6-1, except the added amount of water was modified to 28.6 g. Black precipitation was obtained after the reaction was completed.

Example 6-3

Same conditions applied as Example 6-2, except the added amount of sodium benzoate was modified to 0.78 mol. Black precipitation was obtained after the reaction was completed.

The transmission electron microscopic photograph of the magnetic nanocluster colloid is shown in FIG. 5(d), the scanning electron microscopic photograph is shown in FIG. 6(d), and the saturation magnetization curve is shown in FIG. 8. As shown in FIG. 5(d), the magnetic nanocluster according to this example was found to be approximately 200 nm in diameter.

EXAMPLE 7

Example 7-1

Same conditions applied as Example 1-1, except 0.26 mol of sodium pyruvate was added instead of NaOH. Black precipitation was obtained after the reaction was completed.

Example 7-2

Same conditions applied as Example 7-1, except the added amount of water was modified to 28.6 g. Black precipitation was obtained after the reaction was completed.

Example 7-3

Same conditions applied as Example 7-2, except the added amount of sodium pyruvate was modified to 0.78 mol. Black precipitation was obtained after the reaction was completed.

EXAMPLE 8

Preparation of Magnetic Nanocluster Containing Manganese

Example 8-1

0.05 mol of iron chloride hydrate as magnetic precursor and 0.025 mol of manganese chloride hydrate as metal precursor, 0.26 mol of sodium acrylate as organic ligand, and 14.3 g of water were added to 500 mL of ethylene glycol as organic solvent and then dissolved at 100° C. This solution was refluxed at the high temperature of 300° C. to obtain colloidal dispersion solution wherein the magnetic nanocluster was dispersed as precipitation after the reaction was completed. The prepared magnetic nanocluster colloidal dispersion solution was centrifuged at 4,000 rpm for 30 min, and then washed with ethanol and water to purify and collect the magnetic nanocluster.

The metal content analysis is shown in FIG. 9(b).

Example 8-2

Same conditions applied as Example 8-1, except the added amount of water was modified to 28.6 g.

Example 8-3

Same conditions applied as example 8-2, except 0.78 mol of NaOH was added.

EXAMPLE 9

Preparation of Magnetic Nanocluster Containing Cobalt

Example 9-1

Same conditions applied as Example 8-1, except 0.025 mol of cobalt chloride hydrate was added instead of manganese chloride as metal precursor.

Example 9-2

Same conditions applied as Example 9-1, except the added amount of water was modified to 28.6 g.

Example 9-3

Same conditions applied as Example 9-2, except 0.78 mol of sodium acetate was added.

The analytic result of metal ion content is shown in FIG. 9(c).

EXAMPLE 10

Preparation of Magnetic Nanocluster Containing zinc

Example 10-1

Same conditions applied as Example 8-1, except 0.025 mol of zinc chloride hydrate was added instead of manganese chloride as metal precursor.

Example 10-2

Same conditions applied as Example 10-1, except the added amount of water was modified to 28.6 g.

The metal content analysis is shown in FIG. 9(d).

Example 10-3

Same conditions applied as Example 10-2, except 0.78 mol of sodium pyruvate was added.

What is claimed is:

1. A method of manufacturing a magnetic cluster colloid, comprising the steps of:
   (a) Forming a magnetic compound by condensation reaction of a first metal halide based compound when the first metal halide based compound and an organic ligand are mixed with a solvent, wherein the organic ligand comprises sodium alkyl carboxylate;
   (b) First heating of the magnetic compound to form magnetic particles; and
   (c) Second heating of the magnetic particles to be agglomerated together to form magnetic clusters;
   wherein the magnetic clusters are dispersed in the solvent in colloidal state to form the magnetic cluster colloid,
   wherein, in step (a), a second metal halide ($M_aX_b$, M=Cr, Ni, Ti, Zr, Fe, Co, Zn, Gd, Ta, Nb, Pt, Au, Mg, Mn, Pd, Sr, Ag, Ba, Cu, W, Mo, Sn, Pb, X=F, Cl, Br, I, $0<a\leq5$, $0<b\leq5$) based compound is further included,
   wherein the metal of the second metal halide based compound is different from the metal of the first metal halide based compound,
   wherein the magnetic cluster colloid contains more than one metal, and the magnetic cluster colloid has one or more magnetic properties selected from paramagnetism, diamagnetism, ferromagnetism, antiferromagnetism, ferrimagnetism and super paramagnetism,
   wherein the first heating occurs between 100° C. to 200° C.,
   wherein the second heating occurs between 120° C. to 350° C.,
   wherein an amorphous gel is made in step (a), the amorphous gel undergoes a phase-transition in step (b) which forms a crystalline metal oxide and the crystalline metal oxide is reduced in step (c) to form magnetic clusters.

2. The method of manufacturing the magnetic cluster colloid according to claim 1,
   wherein, in step (a), the metal halide of the first metal halide based compound is $M_aX_b$ (M=Cr, Ni, Ti, Zr, Fe, Co, Zn, Gd, Ta, Nb, Pt, Au, Mg, Mn, Pd, Sr, Ag, Ba, Cu, W, Mo, Sn, Pb, X=F, Cl, Br, I, $0<a\leq5$, $0<b\leq5$).

3. The method of manufacturing the magnetic cluster colloid according to claim 1,
   wherein, in step (a), the solvent is selected from the group consisting of aromatic solvent, heterocyclic solvent, sulfoxide-based solvent, amide-based solvent, hydrocarbon solvent, ether-based solvent, polymer solvent, ionic liquid solvent, halogen hydrocarbon solvent, alcoholic solvent and water.

4. The method of manufacturing the magnetic cluster colloid according to claim 1,
   wherein, in step (a), the size of the magnetic cluster is controlled by adjusting molar ratio of the first metal halide based compound and the organic ligand.

* * * * *